May 10, 1966 P. C. CARROLL 3,250,499
HYPERSONIC DRAG DEVICE
Filed May 20, 1964 2 Sheets-Sheet 1
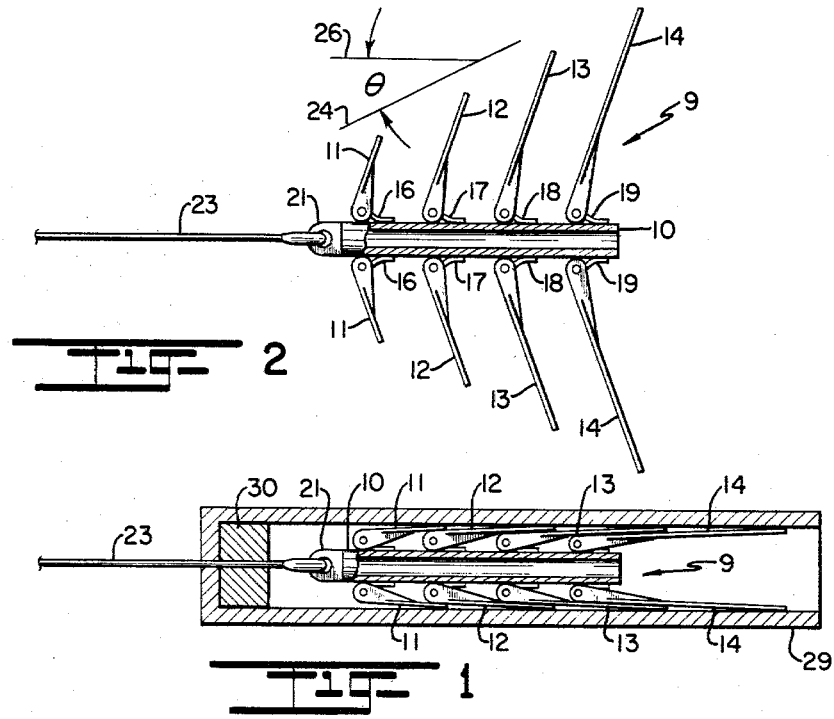
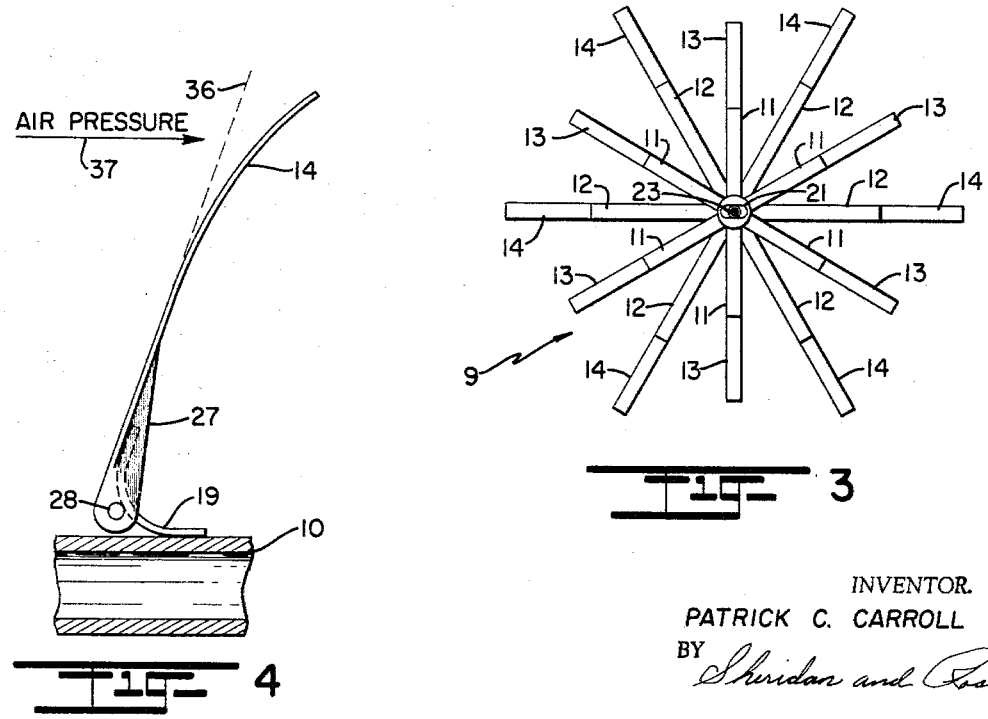
INVENTOR.
PATRICK C. CARROLL
BY Sheridan and Ross
ATTORNEYS INVENTOR.
PATRICK C. CARROLL
BY Sheridan and Ross
ATTORNEYS

United States Patent Office 3,250,499
Patented May 10, 1966

3,250,499
HYPERSONIC DRAG DEVICE
Patrick C. Carroll, Littleton, Colo., assignor to Martin Marietta Corporation, Baltimore, Md., a corporation of Maryland
Filed May 20, 1964, Ser. No. 368,770
12 Claims. (Cl. 244—113)

This invention relates to a device for decelerating a vehicle traveling at high speeds, such as supersonic speeds, and particularly to a decelerator or drag device for use with vehicles moving at hypersonic speeds.

Upon reentry into the earth's atmosphere and in preparation for landing or recovery the vehicle requires additional drag for safe deceleration or it requires additional stability which can be obtained by drag stabilization. Drag stabilization is stabilization of the oscillations of the rapidly moving vehicle by the application thereto of a rearward force such as is achieved by the employment of a drag device. On vehicles moving at subsonic and low supersonic speeds a drogue parachute generally is used for reducing the speed of the vehicle or for stabilization of the vehicle. At hypersonic speeds, however, a drogue parachute is unsatisfactory because at speeds several times that of sound the shock waves and air turbulence cause the parachute to oscillate very rapidly and collapse in an unstable manner. Furthermore, at such high speeds the temperatures are too high for material that is available for construction of parachutes. Similarly, although balloon or ballutes have been successfully tested at hypersonic speeds, suitable, high-temperature resistant materials of construction for such drag devices are not available.

Accordingly, it is an important object of this invention to provide a hypersonic drag device which will operate as a decelerator of a vehicle moving at hypersonic speeds and which will serve to provide stability through drag stabilization of such a vehicle.

Another object of this invention is to provide a decelerator device for vehicles moving at hypersonic speeds which will safely withstand the prevailing aerodynamic stresses and high temperatures encountered by such drag devices. Another object of this invention is to provide a compact, inexpensive to build, highly reliable decelerator device for vehicles moving at high rates of speeds.

Additional objects of this invention will become available from the following description, which is given primarily for purposes of illustration, and not limitation.

Stated in general terms, the objects of the invention are attained by providing a decelerator which includes an elongate central mounting means, such as a mounting tube, adapted at one end thereof for attachment to a high speed vehicle, such as by means of a tow cable, and retractable radial projection means, such as high temperature resistant vanes or blades mounted retractably around the mounting tube to extend radially and resiliently therefrom preferably in an overall generally cone-shaped configuration with the apex thereof forward, to provide reliable and efficient deceleration and dynamic stability of the high speed vehicle and decelerator combination.

A more detailed description of a specific embodiment of the invention is given below with reference to the accompanying drawings, wherein:

FIG. 1 is a side elevational view, partially in vertical section, showing the decelerator in a folded, closed condition in a vehicle housing;

FIG. 2 is a similar view showing the decelerator in a deployed, open condition;

FIG. 3 is a front end view of the decelerator while in the deployed, open condition shown in FIG. 2;

FIG. 4 is a partial detail view drawn to an enlarged scale showing details of a drag blade and mounting spring in side elevation;

Figure 5:
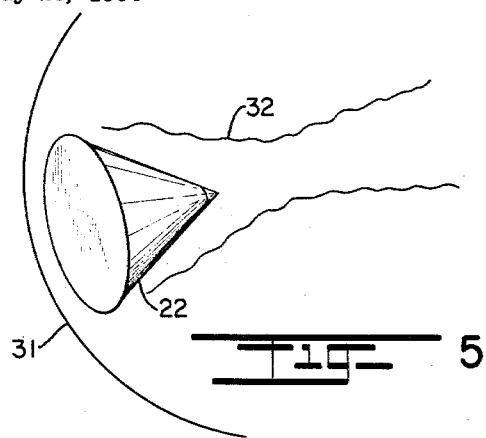
FIG. 5 is a schematic isometric view showing a supersonic vehicle reentering the earth's atmosphere.

In the specific embodiment of the invention, the decelerator, or drag device 9, includes a mounting tube 10; four sets of drag vanes or blades 11, 12, 13 and 14; four corresponding sets of mounting springs 16, 17, 18, and 19; and a cable attachment ring 21 mounted on the front end of mounting tube 10 for attachment of the decelerator 9 to the supersonic speed vehicle 22 through an interconnecting tow cable 23. Because of the ease of fabrication of the relatively simple mounting tube 10, drag blades 11, 12, 13 and 14, mounting springs 16, 17, 18 and 19 and ring 21, these parts can be made of stainless steel which is suitably resistant to the effects of the hgh temperature effects encountered during atmospheric reentry. For added protection, drag blades 11, 12, 13 and 14 can be coated with suitable ablative materials of the types described in the art.

Mounting tube 10, in addition to serving as a sturdy mount for drag blades 11, 12, 13 and 14, and cable attachment ring 21 serves to tie tow cable 23 and mounting tube 10 to supersonic vehicle 22 so that the drag load imparted to the drag blades by the atmosphere is transmitted through the mounting tube, the attachment ring and the tow cable to the supersonic vehicle. Thus mounting tube 10 should be made sufficiently thick and strong to serve this purpose as well as serving as a mount for the drag blades and mounting springs 16, 17, 18 and 19.

Drag blades 11, 12, 13 and 14 and mounting springs 16, 17, 18 and 19 are shown positioned in four groups. The forward group of drag blades 11 is the shortest and the rearward group 14 is the longest. The length of group 12 blades is greater than that of group 11 and the length of group 13 blades is greater than that of group 12, but less than that of group 14 blades so that a generally conical overall configuration is formed by the drag blades having an angle $\theta$, as shown in FIG. 2. The value of angle $\theta$, which a line 24 drawn through the tips of the drag blades makes with the centerline of the decelerator, as represented by line 26 drawn parallel to the centerline, as well as the total number of blades used controls the drag and stability features of the decelerator 9. By decreasing either or both the value of the angle $\theta$ and the number of blades used the decelerator becomes more stable and its drag is decreased, whereas an increase in either or both the angle $\theta$ and the number of blades used causes the decelerator to exert greater drag although the decelerator itself becomes slightly less stable as a result thereof. Further, increasing the spacing between the groups of blades increases the stability of the decelerator.

Each group of drag blades 11, 12, 13 and 14 shown consists of six circularly arranged blades spaced an equal radial distance, or radial angle, from each other and each group of blades is spaced an equal axial distance from each adjacent group along mounting tube 10, as shown in FIGS. 2 and 3, respectively. Drag blades 11, 12, 13 and 14 are made of generally flat strips of metal so that they will have a desired degree of resilience. A rib portion 27, best shown in FIG. 4, is formed or attached longitudinally along the inner portion of each drag blade to serve as an attachment portion.

Drag blades 11, 12, 13 and 14 are attached at their inner end portions to corresponding mounting springs 16, 17, 18 and 19 respectively, through their inner attachment portions 27 as best shown in FIG. 4. Mounting springs 16, 17, 18 and 19, which preferably are leaf springs made of suitable resilient material are in turn attached to the wall of mounting tube 10. The attachments of mounting springs 16, 17, 18 and 19 to mounting tube 10 and inner attachment portions 27 of drag blades 11, 12, 13 and 14 can be made by any suitable fastening or fixing means, such as by welding, brazing, riveting, bolting, etc., not shown. Each attached drag blade, after its attachment to mounting tube 10 via an inner attachment portion 27, as best shown in FIG. 4, can be considered to hinge about a point 28.

It will be seen that drag blade groups 11, 12, 13 and 14 each are composed of six blades equally spaced circumferentially from each other around mounting tube 10, each blade group 11, 12, 13 and 14 is spaced equally from each adjacent group axially along the mounting tube and, as best shown in FIG. 3, the radial spacing of blade groups 11 and 13 coincides with each other and the radial spacing of blade groups 12 and 14 coincides with each other; whereas, the radial spacing of blade groups 11 and 12 is staggered, the radial spacing of groups 12 and 13 is staggered and the radial spacing of groups 13 and 14 is staggered. Other coinciding or staggered arrangements can, of sourse be used, and more, or less, than six drag blades per group can be used. Also, more, or less, than four groups of drag blades can be used, as desired.

Each of the drag blades is securely attached at its inner end to a spring which, in turn, is securely attached to the mounting tube for pivotal movement of the drag blade around its inner end as a pivot point. Such resilient movement of the drag blades around their inner, attached ends permits the rearward movement and folding of drag blades 11, 12, 13 and 14 around pivot points 28 to place the decelerator 9 in a compactly folded, closed, generally cylindrical condition and for neat insertion of the decelerator inside a generally cylindrical vehicle housing 29, behind a motar charge 30, as shown in FIG. 1. In this folded, closed condition the outer ends of the drag blades lie adjacent to, and about mounting tube 10 and the drag blades are held in a folded, closed condition in the decelerator housing 29 at the rear end of supersonic vehicle 22 in readiness for use when the supersonic vehicle enters a reentry stage in its return to earth.

Figure 6:
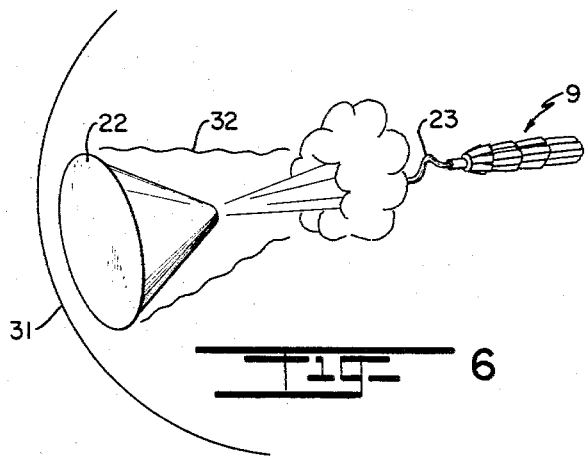
FIG. 6 is a similar view showing forcible ejection of the decelerator rearward of the vehicle in which the blades are just beginning to open radially outwardly.
Figure 7:
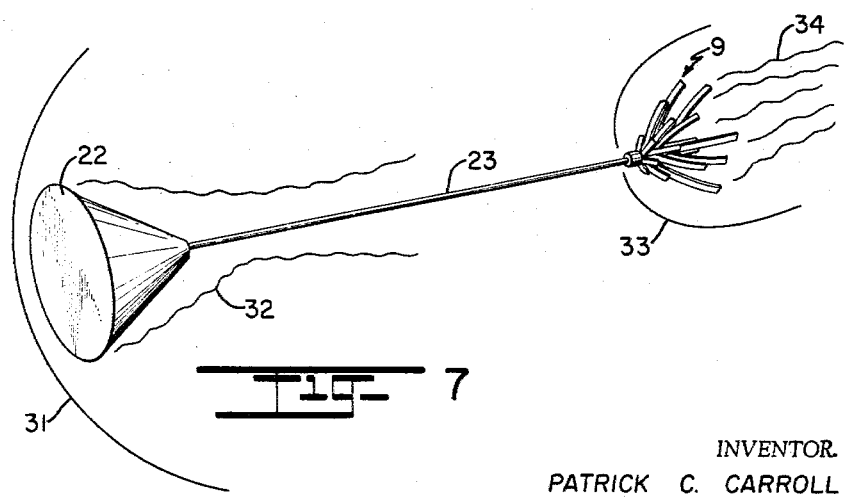
FIG. 7 is a similar view showing the decelerator deployed, the blades fully opened and supplying drag and stability to the vehicle and assembly, respectively.

FIG. 5 shows a vehicle, such as a space capsule 22, forming a bow shock wave 31 and a downstream flow field 32 during atmospheric reentry while traveling at high speed rates, especially hypersonic speed. FIG. 6 shows the decelerator 9 being forced out of the rear end of capsule 22. This can be accomplisred by the use of a mortar charge 30, which is fired in housing or storage tube 29 to eject decelerator 9 forcibly rearward of capsule 22 into downstream flow field 32. Tow cable 23 is stretched taut and decelerator 9 automatically deploys as shown in FIG. 7. Drag blades 11, 12, 13 and 14 are automatically opened due to the loading of mounting springs 16, 17, 18 and 19. Decelerator 9, in downstream flow field 32, generates a bow shock wave 33 and a downstream flow field 34 as it supplies a desired amount of drag and degree of stability upon capsule 22 through tow cable 23.

As best shown in FIG. 4, while decelerator 9 is deployed open, as shown in FIGS. 2 and 7, drag blades 11, 12, 13 and 14, which are resilient to a desired degree, the outer, free ends of the drag blades flex rearwardly as from dotted line 36, due to the air pressure represented by arrow 37.

Thus decelerator 9, even though it is very compact and very light in weight, serves to produce a concentrated drag at the rear end of capsule 22 and keeps it from tumbling while forcing it to maintain its predetermined attitude during free fall reentry into the earth's atmosphere. Stability of the applied drag force, as well as the dynamic stability of the capsule 22 and the decelerator 9 combination, are most impotrant. These features are achieved in the drag device of the invention because the outer, free ends of drag blades 11, 12, 13 and 14, are flexible or resilient and serve to establish an excellent balance between stability and the amount of drag force generated over a wide range of subsonic, supersonic and hypersonic variations in speed of the parent vehicle. As instability is more critical at the higher supersonic and hypersonic speeds, and since the outer, free ends of the drag blades deflect or flex rearwardly to a greater degree at the higher speeds, greater stability is achieved at such higher speeds even though the magnitude of the drag force generated is decreased. At lower speeds, on the other hand, where stability is not nearly as critical as at the higher speeds, the magnitude of the applied drag force generated is increased as the drag blades deflect or flex rearwardly to a lesser degree and more nearly approach dotted line 36, shown in FIG. 4.

It will be seen, therefore that the drag device of the invention possesses a stable configuration, especially at hypersonic speeds, but also at subsonic and low supersonic speeds. These stability features are due to the overall cone shape and the flexibility characteristics of the drag blades. These cone shape and flexibility characteristics result in a very high drag configuration in all speed regimes, including the free molecular flow region, because each exposed drag blade is substantially normal to the air flow. Furthermore, the drag device of the invention has high drag characteristics in continuum flow due to the viscous interaction in and around the rows of drag blades 11, 12, 13 and 14.

Thus, the drag blades are designed to give maximum drag efficiency at extreme altitudes, but reduce the high deceleration loads at maximum dynamic pressure by flexing rearwardly under air pressure loads to give drag modulation. The rows of drug blades 11, 12, 13 and 14 fold compactly for convenient storage in a mortar type storage and ejection tube 29, and upon ejection deploy automatically because they are spring loaded. By virtue of their simple mechanical structure, the drag blades and other parts of the drag device of the invention can be constructed of the more difficult to machine refractory metals, or other refractory materials. Stainless steel, for example, can be economically fabricated into the parts of the drag device of the invention.

It will be understood that drag blades 11, 12, 13 and 14 and mounting springs 16, 17, 18, 19 can be made to have many different structures, shapes and configurations. Obviously, many modifications and variations of the present decelerator or drag device of the invention are possible in the light of the teachings and description given hereinabove. It is, therefore, to be understood that, within the scope of the appended claims, the invention can be practiced otherwise than as specifically described in connection with the appended drawings.

What is claimed is:

1. A decelerator adapted to be attached to an object that is moving through the air at high speeds including;
   an elongated body;
   means for attaching said elongated body to said object;
   a plurality of axially and radially spaced drag blades each having one end pivotally attached to said body;
   means resiliently biasing each of said drag blades, causing the other end thereof to extend outwardly from said body for creating air turbulences and generating air drag; and
   releasable means adapted to retain said drag blades in a pivoted position generally parallel to said body, prior to use.

2. A decelerator as set forth in claim 1, wherein said body has a front end and a rear end and said axially spaced blades progressively increase in length from said front end to said rear end of said body, forming a generally conical shape when said blades are in open position.

3. A decelerator, as set forth in claim 1, wherein at least some of said axially spaced blades are also radially spaced from each other.

4. A decelerator, as set forth in claim 1, wherein said resilient means includes a leaf spring adjacent said one end.

5. A decelerator, as set forth in claim 1, wherein said releasable means includes a cylindrical storage tube extending over said blades; and means within said storage tube for removing said decelerator from said storage tube.

6. A decelerator, as set forth in claim 5, wherein said storage tube is closed at one end and said explosive means is positioned within said storage tube between said closed end and said elongated body of said decelerator.

7. a decelerator, as set forth in claim 1, wherein said drag blades are resilient, being adapted to flex rearwardly at their free ends when passing through air at high speeds to establish a balance between the magnitude of drag generated and the amount of stability supplied to a combination of said object and said decelerator over a wide range of speeds from subsonic to hypersonic.

8. A decelerator, adapted to be attached to and deployed rearwardly of an object moving in hypersonic speeds including;

an elongated body having a forward end and a rear end;

connecting means at the forward end of said body for connecting a tow cable extending to said object;

a first set of radially spaced drag blades, each having one end pivotally connected to said body;

a second set of radially spaced drag blades each having one end pivotally connected to said body rearwardly of said first set of drag blades and radially spaced from said first set;

spring means connected to said drag blades causing the outer end thereof to extend outwardly from said body for creating air turbulences and generating air drag; and releasable means slideable over said body and adapted to retain said sets of drag blades in a pivoted position generally parallel to said body, prior to use.

9. A decelerator, as set forth in claim 8, wherein said releasable means includes;

a cylindrical body adapted to slide over said blades;

an end wall closing the forward end thereof having a central hole there in through which said tow cable is adapted to extend; and means within said cylinder for expelling said decelerator from said cylindrical body, during deployment.

10. A decelerator, as set forth in claim 9, wherein said expelling means includes explosive means within said cylindrical body between said end wall and said elongated body of said decelerator.

11. A decelerator, as set forth in claim 8, wherein said second set of drag blades is longer than said first set of drag blades, said first and second set of drag blades forming a generally conical shape when said blades are open.

12. A decelerator, as set forth in claim 8, wherein said drag blades are resilient and adapted to flex rearwardly at their free ends when passing through air at high speeds to establish a balance between the magnitude of drag generated and the amount of stability supplied to a combination of an object and said decelerator over a wide range of speeds from subsonic to hypersonic.

References Cited by the Examiner

UNITED STATES PATENTS

| | | | |
|---|---|---|---|
| 3,004,489 | 10/1961 | Griffith et al. | 244—113 |
| 3,047,259 | 7/1962 | Tatnall et al. | 244—138 |
| 3,114,315 | 12/1963 | Trump | 244—138 |

MILTON BUCHLER, *Primary Examiner.*

FERGUS S. MIDDLETON, *Examiner.*

L. C. HALL, *Assistant Examiner.*